(12) United States Patent
Diab et al.

(10) Patent No.: US 9,191,415 B2
(45) Date of Patent: Nov. 17, 2015

(54) METHOD AND SYSTEM FOR PROVIDING VIRTUAL GATEWAY SERVICES

(75) Inventors: Wael William Diab, San Francisco, CA (US); Jeyhan Karaoguz, Irvine, CA (US); Xuemin Chen, San Diego, CA (US); David Garrett, Tustin, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 634 days.

(21) Appl. No.: 12/982,036

(22) Filed: Dec. 30, 2010

(65) Prior Publication Data

US 2011/0299543 A1 Dec. 8, 2011

Related U.S. Application Data

(60) Provisional application No. 61/351,696, filed on Jun. 4, 2010.

(51) Int. Cl.

| | |
|---|---|
| H04L 12/28 | (2006.01) |
| H04L 29/06 | (2006.01) |
| H04W 12/08 | (2009.01) |
| G06Q 20/10 | (2012.01) |
| H04L 12/857 | (2013.01) |
| H04L 29/08 | (2006.01) |
| G06Q 30/02 | (2012.01) |
| G06F 21/10 | (2013.01) |
| H04L 12/24 | (2006.01) |

(52) U.S. Cl.
CPC .............. *H04L 65/102* (2013.01); *G06F 21/10* (2013.01); *G06Q 20/10* (2013.01); *G06Q 30/0226* (2013.01); *H04L 47/2491* (2013.01); *H04L 63/0281* (2013.01); *H04L 63/10* (2013.01); *H04L 63/205* (2013.01); *H04L 65/40* (2013.01); *H04L 67/10* (2013.01); *H04W 12/08* (2013.01); *H04L 41/32* (2013.01); *H04L 41/5019* (2013.01)

(58) Field of Classification Search
CPC .... Y02B 60/50; Y02B 60/142; Y02B 60/165; H04L 41/0836; H04L 43/0811; H04L 5/00; H04L 41/14; H04L 41/0833; H04L 41/50; H04L 65/102; H04L 63/10; H04L 47/2491; G06Q 30/0226

See application file for complete search history.

(56) References Cited

U.S. PATENT DOCUMENTS

| | | | |
|---|---|---|---|
| 7,675,870 B2 * | 3/2010 | Chun et al. ............... | 370/255 |
| 8,018,934 B2 * | 9/2011 | Liu ............................ | 370/390 |
| 8,145,733 B1 * | 3/2012 | Cheng et al. ............. | 709/220 |

(Continued)

*Primary Examiner* — Mounir Moutaouakil
(74) *Attorney, Agent, or Firm* — Foley & Lardner LLP; Christopher J. McKenna; Paul M. H. Pua

(57) ABSTRACT

A broadband gateway configured to operate as a virtual broadband gateway may comprise a network portion and a local portion. The network portion is communicatively coupled to the local portion via a plurality of physical layer connections to one or more network access service providers. The virtual broadband gateway may acquire content from one or more providers, process the content for delivery to one or more local devices, and deliver the content to the one or more local devices. The remote portion may be implemented in one or more network devices. The network devices may be owned and/or operated by one or more content providers, one or more network access service providers, and/or one or more independent entities. Gateway functions performed by the network portion may comprise, for example, content downloading, content streaming, content authentication, data format conversion, service negotiation, service selection, data encryption, data decryption and/or data storage.

21 Claims, 7 Drawing Sheets

(56) References Cited

U.S. PATENT DOCUMENTS

| | | |
|---|---|---|
| 8,279,753 B2 * | 10/2012 | Singh .............................. 370/229 |
| 2003/0161333 A1 * | 8/2003 | Schain et al. .................. 370/401 |
| 2009/0080445 A1 * | 3/2009 | Kolakeri et al. .............. 370/401 |
| 2009/0161616 A1 * | 6/2009 | Ramesh et al. ............... 370/329 |
| 2009/0262689 A1 * | 10/2009 | Jeong et al. ................... 370/329 |
| 2009/0327778 A1 * | 12/2009 | Shiga et al. .................... 713/320 |
| 2010/0329276 A1 * | 12/2010 | Wang et al. ................... 370/419 |
| 2011/0116482 A1 * | 5/2011 | Ansari .......................... 370/338 |
| 2011/0283014 A1 * | 11/2011 | Malik et al. ................... 709/233 |

\* cited by examiner

METHOD AND SYSTEM FOR PROVIDING VIRTUAL GATEWAY SERVICES

CROSS-REFERENCE TO RELATED APPLICATIONS/INCORPORATION BY REFERENCE

This patent application makes reference to, claims priority to, and claims benefit from U.S. Provisional Application Ser. No. 61/351,696, which was filed on Jun. 4, 2010.

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,753 filed on Dec. 30, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for providing virtual gateway services.

BACKGROUND OF THE INVENTION

Telecommunication technologies have evolved from analog to digital technologies, and continue to evolve from circuit switched to packet switched, from connection oriented packet switching to connectionless packet switching, and from narrow band applications to broadband applications. The accompanied evolution in telecommunication technologies has significantly advanced operators' capability to offer broadband, IP-based multimedia services ranging from entertainment and lifestyle applications such as mobile TV and mobile payment to professional services such as video conferencing and real-time data exchange.

With the continuous growth of digital television or broadcast multimedia and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more display devices that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcasts, service providers may require use of dedicated equipment such as set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in home networks for the same purpose.

As the use of home networks grows in popularity, there is an opportunity for such networks to support the type of applications and content that may be provided through broadband services. One approach is to use gateways to bring broadband-based applications and/or content into the home.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing virtual gateway services, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for providing virtual gateway services. In various embodiments of the invention, a broadband gateway configured to operate as a virtual broadband gateway may comprise a network portion and a local portion. The network portion is communicatively coupled to the local portion via a plurality of physical layer connections to one or more network access service providers. The virtual broadband gateway may be operable to acquire content from one or more providers, process the content for delivery to one or more local devices handled by the virtual broadband gateway, and deliver the content to the one or more local devices. The network portion of the virtual broadband gateway may be implemented in one or more network devices. The network devices may be owned and/or operated by one or more content providers, one or more network access service providers, and/or one or more independent entities. Resources of the one or more network devices may be allocated to the network portion of the virtual broadband gateway based on energy consumption of the network portion. Gateway functions performed by the network portion may comprise, for example, content downloading, content streaming, content authentication, data format conversion, service negotiation, service selection, data encryption, data decryption and/or data storage.

Resources of one or more local devices may be allocated to the local portion of the virtual broadband gateway. Resources of the local devices may be allocated to the local portion of the virtual broadband gateway based on, for example, energy consumption to the local portion, capabilities of the local devices, and/or capacities of the local devices. Gateway functions performed by the local portion may comprise for example, depacketization, data encryption, data decryption and/or data storage.

Figure 1A:
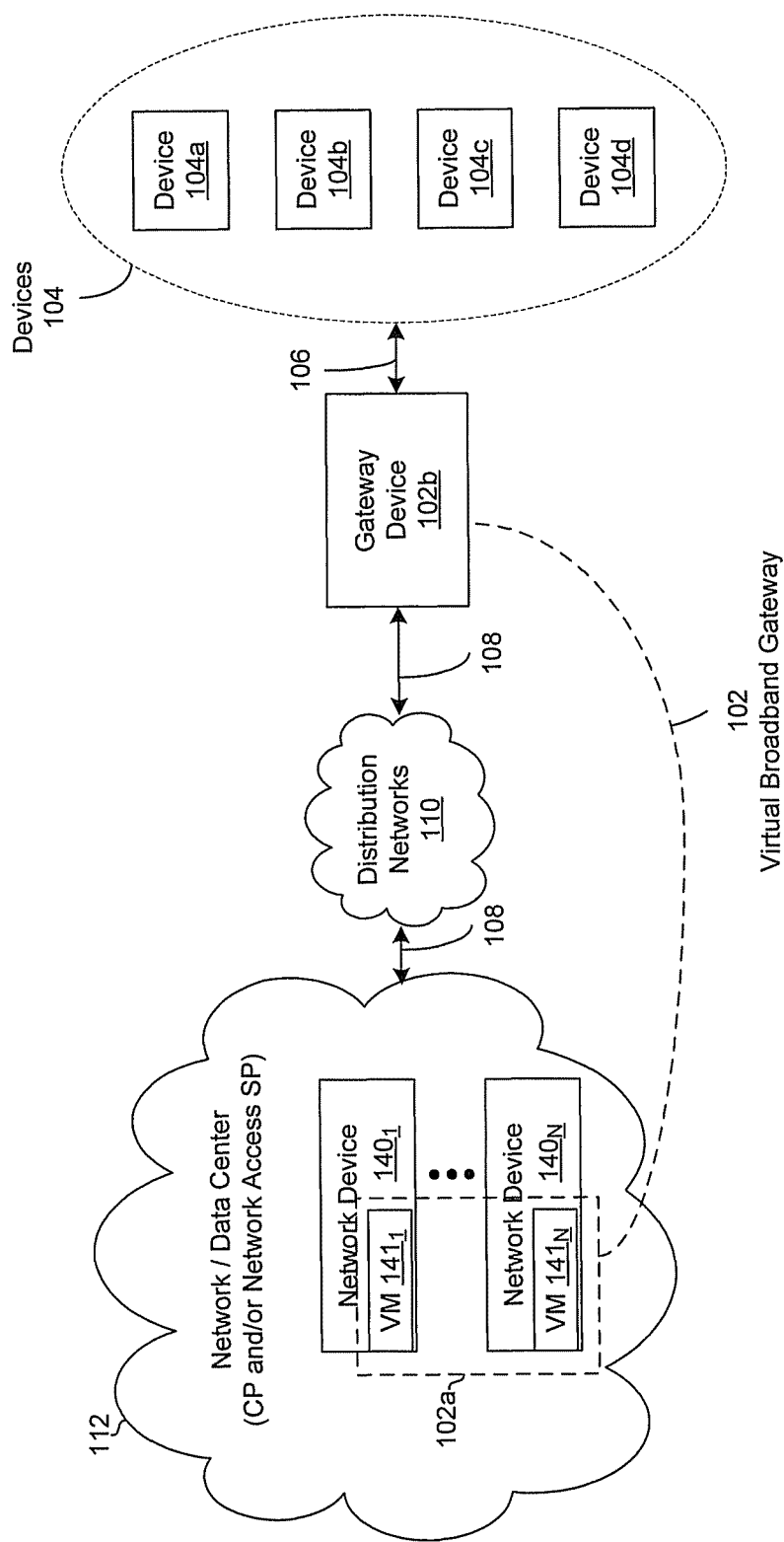
FIG. 1A is a block diagram illustrating an exemplary communication system that is operable to provide virtual gateway services, in accordance with an embodiment of the invention.

FIG. 1A is a block diagram illustrating an exemplary communication system that is operable to provide virtual gateway services, in accordance with an embodiment of the invention. Referring to FIG. 1A, there is shown a communication system 100. The communication system 100 may comprise a virtual broadband gateway 102, a plurality of distribution networks 110, a plurality of devices 104 of which devices 104a-104d are illustrated and a cloud 112 representing one or more networks of one or more network access service providers and/or content providers. The devices 104a-104d may be serviced by the broadband gateway 102.

A content provider (CP) may comprise suitable logic, circuitry, interfaces and/or code that may be operable to generate, capture and/or package content such as, for example, multimedia content that may be distributed to one or more of the devices 104a-104d via one or more of the network access service providers and the virtual broadband gateway 102. The content may be, for example, downloadable or streaming, and/or rented or purchased.

A network access service provider (SP) may comprise suitable logic, circuitry, interfaces and/or code that may be operable to provide services using different access technologies to one or more of the devices 104a-104d for end-users via the virtual broadband gateway 102. The services may include, but are not limited to, multimedia, television, Internet, phone, Ethernet, multimedia over coax alliance (MoCA), passive optical network (PON), and/or cellular services, for example. The network access service providers may provide physical layer connections to the virtual broadband gateway 102. Such physical layer connections may then be utilized by the virtual broadband gateway 102 to access content provided by the content providers, to access services provided by other service providers, and/or to access an intranet or the Internet at-large. In this regard, "network access service provider" as utilized herein, is distinguished from the more generic term "service provider" which may encompass services other than providing physical layer access. Cable television (CATV) providers, plain old telephone service (POTS) providers, digital subscriber line (DSL) providers, cellular service providers, WiMAX providers and/or satellite providers are examples of network access service providers. In some instances, a network access service provider may be a provider that provides both content and services.

A network of each of content provider and/or network access service provider may comprise one or more data centers. A data center may comprise suitable logic, circuitry, interfaces and/or code that may be operable to provide various applications and/or server services. Thus, each CP and/or network access SP network may comprise one or more network devices $140_1$-$140_N$. The network devices $140_1$-$140_N$ may comprise, for example, servers, network switches, and/or routers. One or more virtual machines such as the virtual machines $141_1$-$141_N$ may run on the network devices $140_1$-$140_N$. A virtual machine such as the virtual machine $141_1$ is a software implementation of a machine such as a server or a computer. The virtual machine $141_1$ may execute programs or applications like a physical machine. For example, the virtual machine $141_1$ may provide a complete system platform which supports the execution of a complete operating system (OS). The software layer which provides the virtualization is called a hypervisor. A hypervisor may run on bare hardware or on top of an operating system. In other instances, the virtual machine $141_1$ may provide a platform that only supports a single process or application, for example.

The virtual broadband gateway 102 may comprise suitable logic, circuitry, interfaces and/or code that may be operable to provide an interface and connectivity between one or more of the devices 104a-104d and one or more of the distribution networks 110. For example, the virtual broadband gateway 102 may support configuring and/or using a plurality of broadband connections 108 to the distribution networks 110. The broadband connections 108 may comprise wired and/or wireless connections between the virtual broadband gateway 102 and the distribution networks 110. In this regard, the virtual broadband gateway 102 may be operable to perform and/or provide various services that may pertain to enabling and/or facilitating reception of content such as multimedia content from one or more of the content providers. The content may be delivered through one or more of the network access service providers. The virtual broadband gateway 102 may communicate with various devices 104a-104d using wired, optical and/or wireless communication links 106.

A single virtual broadband gateway such as the virtual broadband gateway 102 may be operable to handle a plurality of physical layer connections to the distribution networks 110, where different ones or portions of the distribution networks 110 may be owned, operated, leased or associated with different network access service providers. A physical layer may refer to an open systems interconnection (OSI) layer 1. In this regard, for example, a first network access service provider may provide network access to the virtual broadband gateway 102 via a DSL connection over twisted-pair cabling, and a second network access service provider may provide network access to the virtual broadband gateway 102 via a cable television connection over coaxial cabling. In some instances, the virtual broadband gateway 102 may be operable to concurrently communicate over the plurality of physical layer connections provided by a plurality of network access service providers.

In an exemplary embodiment of the invention, some functions of the virtual broadband gateway 102 may be performed by the virtual machines $141_1$-$141_N$, and some functions of the gateway may be implemented by the dedicated gateway device 102b. In this regard, since one or more gateway functions are implemented in the portion 102a, the dedicated gateway device 102b may be simplified or "stripped down" relative to a fully functional self-contained gateway. Gateway functions may be allocated among the network devices $140_1$-$140_N$ based on, for example, capabilities and/or capacities of the network devices $140_1$-$140_N$.

Exemplary gateway functions which may be performed in either the portion 102a or the portion 102b may comprise acquiring content, storing content to storage allocated to the virtual broadband gateway 102, content authentication, data format conversion, service negotiation, service selection, data encryption, data decryption, data compression, and/or data decompression.

Whether a particular gateway function is performed in the portion 102a or the portion 102b may be based on whether the function needs to occur after data has been communicated over the network(s) 110. For example, content likely needs to be encrypted while traversing the network(s) 110. Accordingly, the portion 102a may perform encryption functions and the device 102b may perform decryption functions. Similarly, functions for obtaining content from content providers may be performed by the portion 102a. Such functions may comprise, for example, functions for negotiating service level agreements with content providers.

Whether a particular gateway function is performed in the portion 102a or the portion 102b may also be based the resources required for performing the function. In this regard, processing that is hardware intensive may be allocated to the portion 102a, if possible, in order to take advantage of the large number of hardware resources available in data center. For example, transcoding or reformatting of content may be processor and/or memory intensive and may be more efficiently performed in the network Additionally or alternatively, the allocation of functions among the network devices $140_1$-$140_N$ may be performed with a goal of more efficient use of energy and/or network hardware resources. For example, allocating storage to the portion 102a may reduce the number of times content is communicated and/or stored. In this regard, if multiple virtual broadband gateways 102 are implemented in one or more common network devices 140, then it may be possible to store the content in a shared or common storage and then each virtual broadband gateway 102 can simply store a pointer to the content.

A device such as the device 104a may comprise suitable logic, circuitry, interfaces and/or code that may be operable to interact with the virtual broadband gateway 102. The devices 104a-104d serviced by, and/or connected with the virtual broadband gateway 102 may comprise content consuming devices and/or non-content consuming household devices. For example, the devices 104 may comprise a television, a set-top box (STB), a laptop computer, a smoke detector, a carbon monoxide detector, a security alarm, a desk top computer and/or server, a mobile phone, a speaker, an AM/FM radio, a phone, and/or an appliance such as a refrigerator. The devices 104a-104d may interact with the virtual broadband gateway 102 via the links 106 utilizing various wired and/or wireless communication technologies such as, for example, Bluetooth, LTE, WiFi and/or Ethernet.

In the exemplary embodiment of the invention illustrated in FIG. 1A, although the devices 104a-104d which are communicatively coupled to only the virtual broadband gateway 102 are shown, the invention may not be so limited. Accordingly, the devices 104a-104d which are communicatively coupled to multiple broadband gateways in a local or home network may be illustrated without departing from the spirit and scope of various embodiments of the invention.

The distribution networks 110 may comprise suitable logic, circuitry, communication devices, interfaces and/or code that may be operable to enable wireless and/or wired communication among a plurality of local and/or remote entities, based on one or more networking and/or communication infrastructures. In this regard, one or more of the distribution networks 110 may be utilized to enable distribution of content such as multimedia content generated by one or more of the content providers in the cloud 112, via one or more of the network access service providers in the cloud 112, to one or more of the devices 104a-104d. The network connectivity available via the distribution networks 110 may be based on one or more communication standards and/or protocols. The distribution networks 110 may comprise, for example, Internet, cable television (CATV) network, satellite television (TV) network, wired or wireless local area network (LAN), wired or wireless wide area network (WAN), personal area network (PAN) and/or cellular network.

In operation, the network portion 102a of the virtual broadband gateway 102 may obtain content and may store the obtained content until one or more of the devices 104 are ready to consume the content. To obtain the content, the portion 102a may engage in negotiation and/or arbitration with one or more content providers and/or network access service providers in the cloud 112. Upon obtaining the content the portion 102a may transcode and/or reformat the content to make it suitable for a device such as the device 104a for which the content is destined. The portion 102a may also store the content. Upon a device such as the device 104a being ready to consume the content, the portion 102b may request the content from the portion 102a. The portion 102a may packetize and encrypt the content to make it suitable for transmission over a public network. The portion 102b may de-packetize the content, decrypt the content, and convey the content to the destination device 104a.

Figure 1B:
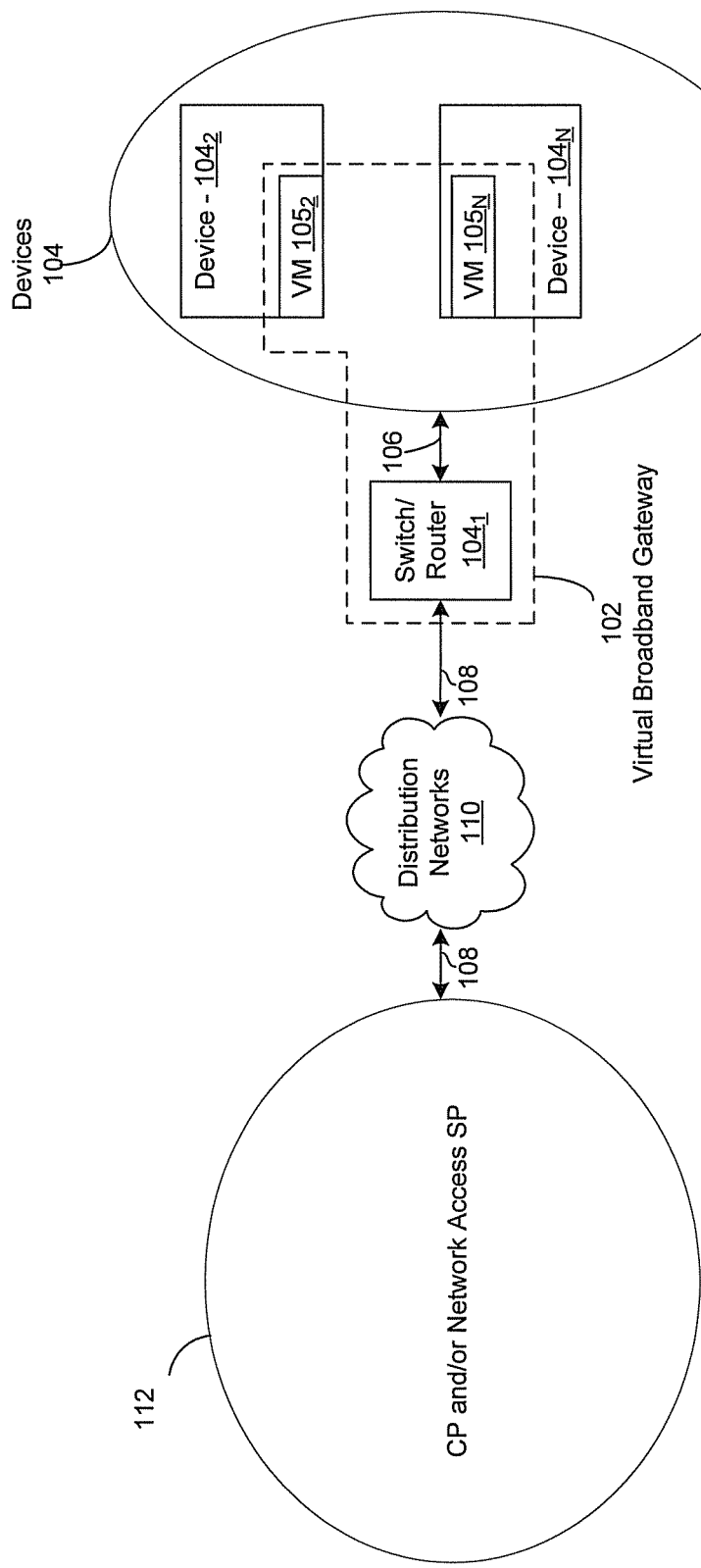
FIG. 1B is a diagram illustrating a virtual gateway distributed among devices in a home network, in accordance with an embodiment of the invention.

FIG. 1B is a diagram illustrating a virtual gateway distributed among devices in a home network, in accordance with an embodiment of the invention. Referring to FIG. 1B, the virtual broadband gateway 102 may be distributed over the devices $104_1$-$104_N$. The virtual broadband gateway 102 may be configured, and resources in the devices 104 allocated, based on capabilities and/or availability of the devices 104. The capabilities and/or availability may be determined via an exchange of parameters, where the parameters may comprise, for example, storage capacity, processor usage, access time, communication bandwidth, and/or latency. The parameters may be communicated among the network devices $104_1$-$104_N$ using protocols such as the audio video bridging (AVB) suite of protocols or simple network management protocol (SMNP), for example. In this manner, specified functions within the virtual broadband gateway 102 may be executed within one or the device 104 with preferred performance with respect to that function. For example, the device $104_2$ with high processor speed may be utilized for processor-intensive functions of the virtual broadband gateway 120, and storage-intensive operations may be executed on the device $104_N$ having high storage capacity.

The various devices 104 on which the virtual broadband gateway 102 is implemented may be communicatively coupled to one another, and to the network(s) 110, via a network switch and/or router $104_1$. In an embodiment of the invention, a hypervisor may run on the device $104_1$ and may coordinate the operation of the various resources of the virtual broadband gateway 102.

Figure 1C:
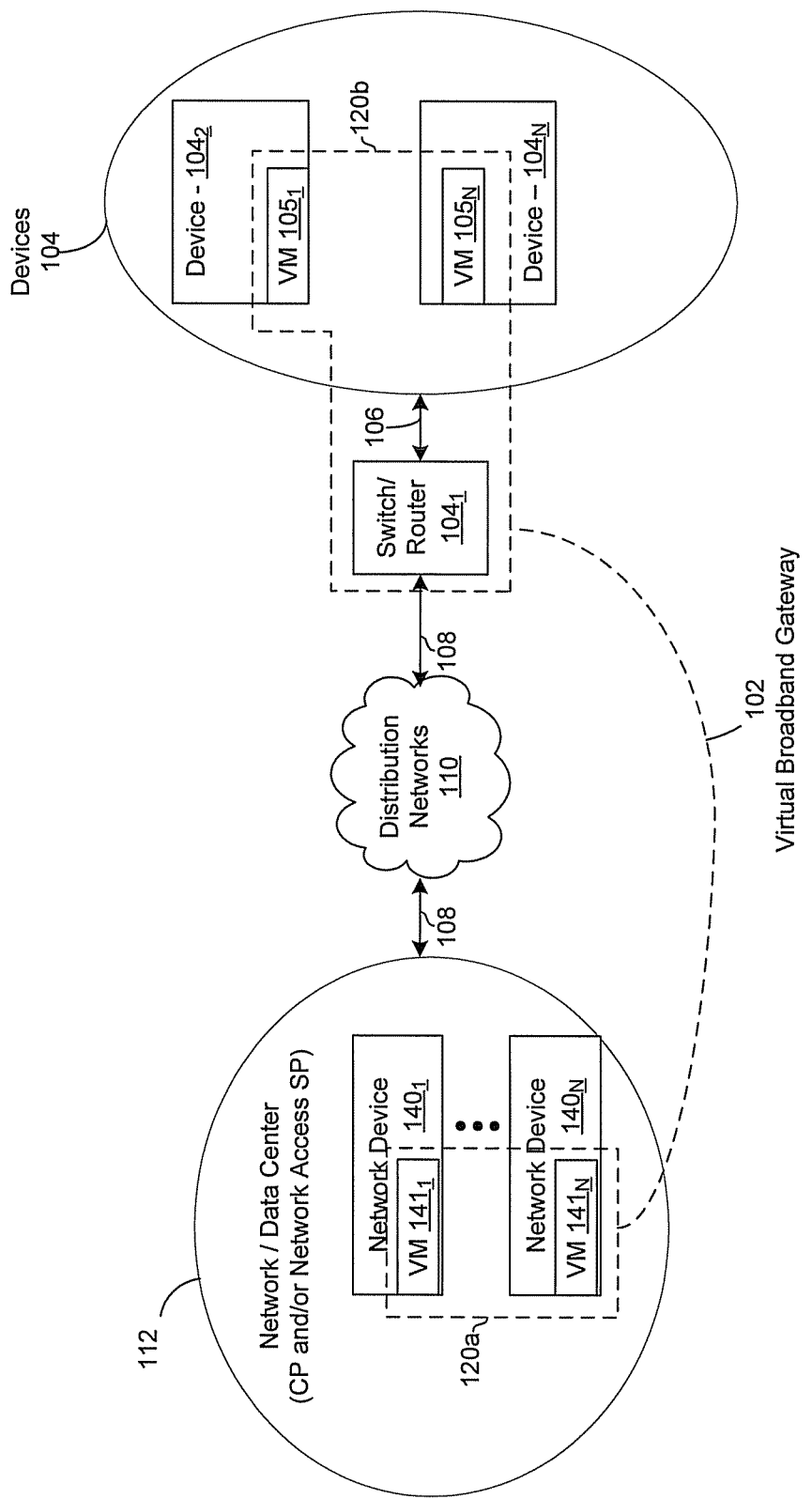
FIG. 1C is a diagram illustrating a virtual gateway distributed among devices in a home network and devices in a remote network, in accordance with an embodiment of the invention.

FIG. 1C is a diagram illustrating a virtual gateway distributed among devices in a home network and devices in a remote network, in accordance with an embodiment of the invention. In this regard, FIG. 1C illustrates an embodiment where the virtual broadband gateway 102 is distributed among network devices 140 and local devices 104. In an exemplary embodiment a primary hypervisor may run on one or more of the network devices 140 and a sub-hypervisor may run on the device $104_1$.

Figure 2:
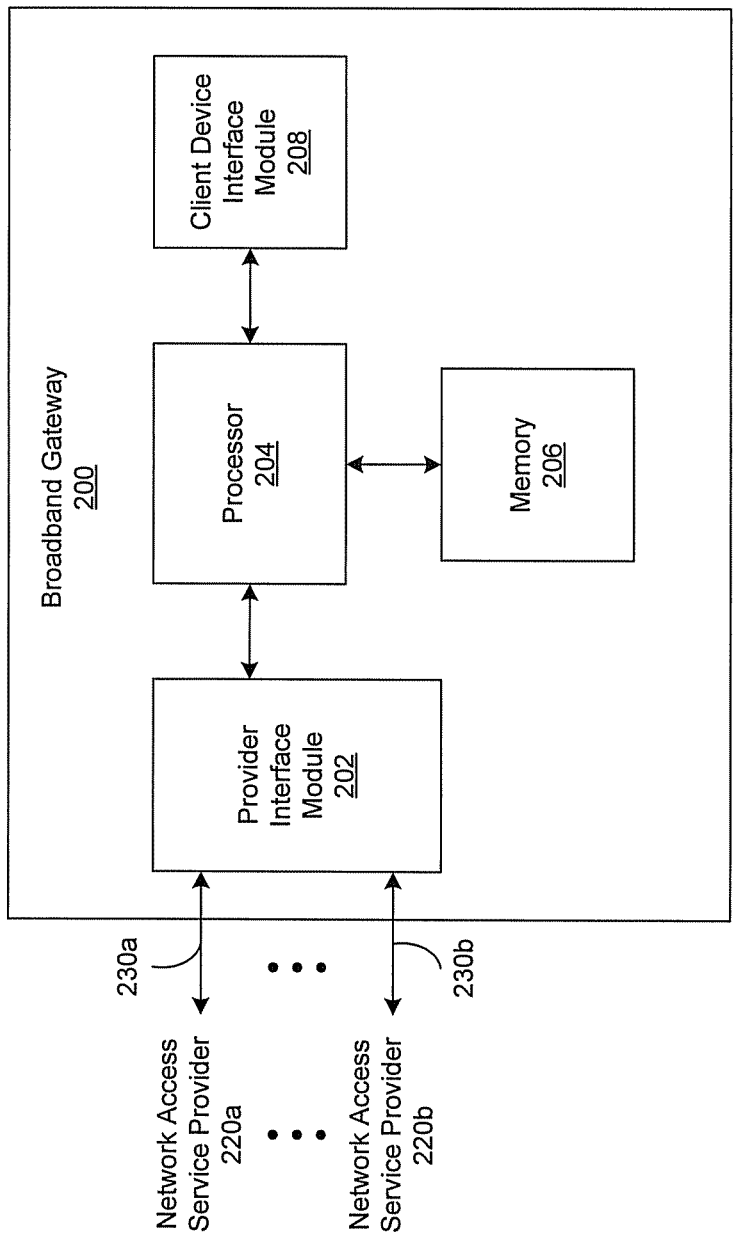
FIG. 2 is a block diagram illustrating an exemplary broadband gateway that is operable to provide virtual gateway services, in accordance with an embodiment of the invention.

FIG. 2 is a block diagram illustrating an exemplary broadband gateway that is operable to provide virtual gateway services, in accordance with an embodiment of the invention. Referring to FIG. 2, there is shown a broadband gateway 200. The broadband gateway 200 may comprise a provider interface module 202, a processor 204, a memory 206 and a client device interface module 208.

The provider interface module 202 may comprise suitable logic, circuitry, interfaces and/or code that may be operable to receive data from one or more network access service providers 220a-220b. The provider interface module 202 may also be operable to send data to one or more network access service providers 220a-220b. The provider interface module 202 may be operable to support multiple communication protocols, standards, and/or data transport technologies. The provider interface module 202 may be communicatively coupled to one or more network access service providers 220a-220b via one or more physical layer connections 230a-230b. In this regard, each of the physical layer connections 230a-230b may connect the broadband gateway 200 to one of different network access service providers 220a-220b. Each of the physical layer connections 230a-230b may comprise a wired, optical and/or wireless connection. For example, the physical layer connection 230a may comprise a DSL over twisted-pair connection while the physical layer connection 230b may comprise a CATV over coaxial cable connection. In an exemplary embodiment of the invention, the provider interface module 202 may be virtualized.

The processor 204 may comprise suitable logic, circuitry, interfaces and/or code that may be operable to process data received from the network access service providers 220a-120b and/or content providers and/or data received from one or more of the devices 104a-104d. In this regard, the processor 204 may comprise one or more portions that are suitable to handle certain types of data such as video data and/or audio data, for example. In an exemplary embodiment of the invention, the processor 204 may be virtualized. In this regard, one or more functions of the processor 204 may be performed by processing resources of one or more network devices 140 and/or local devices 104. In an exemplary embodiment of the invention, one or more virtual machines may run on the network devices 140 and/or local devices 104 to implement various processing functions.

The memory 206 may comprise suitable logic, circuitry, interfaces and/or code that may be operable to store data utilized in the operations of the broadband gateway 200. For example, the memory 206 may be utilized to store configuration data, parameters, device information, tracking and/or monitoring information, security information, and intermediate processing data, for example. The memory 206 may comprise storage media integrated in the broadband gateway 200 and/or a removable storage device. In an exemplary embodiment of the invention, the memory 206 may be virtualized. In this regard, the virtual memory 206 may comprise memory elements residing in one or more of the network devices 140 and/or local devices 104.

The client device interface module 208 may comprise suitable logic, circuitry, interfaces and/or code that may be operable to send data to one or more of the devices such as the devices 104a-104d in a local or home network. The client device interface module 208 may also be operable to receive data from one or more of the devices 104a-104d in the local or home network. The client device interface module 208 may be operable to support multiple communication protocols, standards, and/or data transport technologies. In an exemplary embodiment of the invention, the client device interface module 208 may be virtualized.

In operation, a broadband gateway such as the broadband gateway 200 may provide connections and/or interfaces for various devices such as the devices 104a-104d to distribution networks such as the distribution networks 110. The processor 204 may be operable to perform one or more processing functions such as content downloading, content authentication, content depacketization, content encryption and/or decryption, and content compression and/or decompression. Various ones of the processing functions may be implemented, for example, by one or more corresponding virtual machines such as the virtual machines $141_1$-$141_N$ in the network devices $140_1$-$140_N$. Various ones of the processing functions may be implemented by, for example, processing resources in the local devices 104 and/or processing resources in the network devices 140. Distribution of the processing functions may be determined based on, for example, processing capacity and/or capabilities of the local devices 104 and/or the network devices 140.

Figure 3:
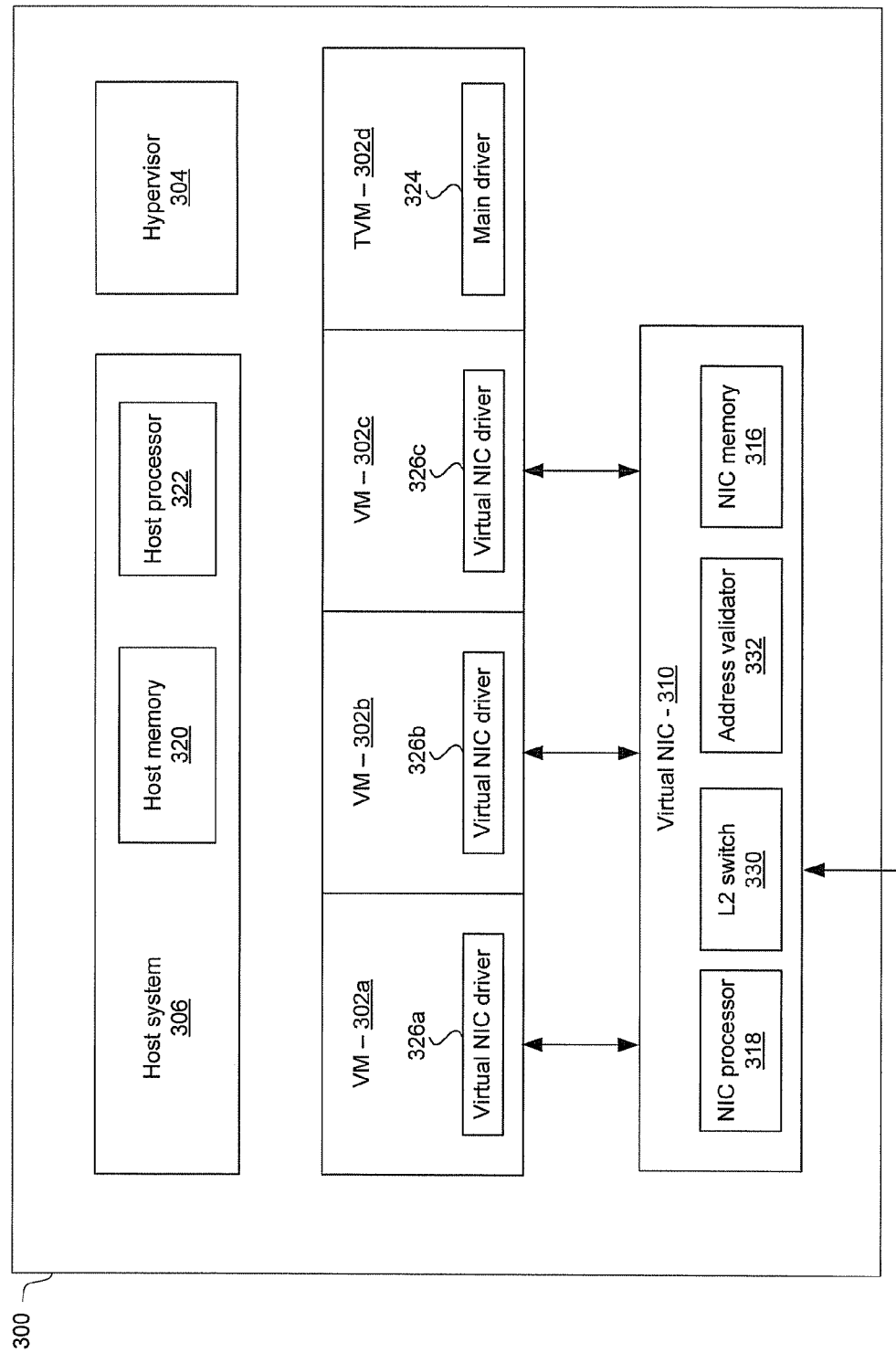
FIG. 3 is a block diagram illustrating an exemplary virtual machine architecture, in accordance with an embodiment of the invention.

FIG. 3 is a block diagram illustrating an exemplary virtual machine architecture, in accordance with an embodiment of the invention. Referring to FIG. 3, there is shown a virtual machine 300 comprising one or more virtual machines (VMs) 302a, 302b, and 302c, a transfer virtual machine (TVM) 302d, a hypervisor 304, a host system 306, and a NIC 310. The TVM 302d may comprise a main driver 324. The host system 306 may comprise a host processor 322 and a host memory 320. The NIC 310 may comprise a NIC processor 318, a NIC memory 316, a L2 switch 330, and a physical address validator 332. Various portions of the exemplary virtual machine 300 may be implemented in one or more of the network devices 140, and/or one or more of the local devices 104.

The host system 306 may comprise suitable logic, circuitry, interfaces, and/or code that may be operable to process data and/or perform network communication and/or routing operations, for example. The host system 306 may support operation of one or more VMs via the hypervisor 304, for example, the VMs 302a, 302b, and 302c. The VMs 302a, 302b, and 302c may each correspond to an operating system, for example, that may enable the running and/or execution of various operations or services. The number of VMs that may be supported by the host system 306 and/or the hypervisor 304 need not be limited to any specific number. For example, one or more VMs may be supported by the host system 306. Internal switching may occur between VMs or between a VM and the TVM 302d. In various embodiments of the invention, resources allocated for implementing the one or more VMs 302 may reside in the portion 102b (FIG. 1A), in one or more of the local devices $104_1$-$104_N$, and/or in one or more of the network devices $140_1$-$140_N$.

In an exemplary embodiment of the invention, the VMs 302a, 302b, 302c may each implement one or more functions of a broadband gateway such as the virtual broadband gateway 102. The implemented functions may comprise, for example, content downloading, content streaming, content authentication, data format conversion, service negotiation, service selection, data encryption, data decryption, data compression, data decompression and/or data storage. In various embodiments of the invention, resources allocated for implementing the VMs 302a, 302b, 302c may reside in the portion 102b (FIG. 1A), in one or more of the local devices $104_1$-$104_N$, and/or in one or more of the network devices $140_1$-$140_N$.

The hypervisor 304 and/or the TVM 302d may operate as a software layer that may enable virtualization of hardware resources in the host system 306 and/or virtualization of hardware resources communicatively connected to the host system 306, such as the NIC 310, for example. The hypervisor 304 and/or the TVM 302d may allocate hardware resources that may be distributed over a network and also may enable data communication between the VMs and hardware resources in the host system 306 and/or hardware resources communicatively connected to the host system 306. For example, the hypervisor 304 may enable communication between the VMs supported by the host system 306 and the NIC 310. In instances when a VM is engaged in network transmission or reception, data may be communicated directly to and/or from the NIC 310 after the TVM 302d has allocated queues, internal resources required on the NIC 310 and/or has consulted configuration and administrative information for the NIC 310. In an embodiment of the invention, resources allocated for implementing the hypervisor 304 may reside in the portion 102b (FIG. 1A), in the local device $104_1$, or in a network device such as the network device $140_1$.

The TVM 302d may comprise a main, driver 324 that may coordinate the transfer of data between the VMs. The main driver 324 may communicate with the virtual NIC driver 326a in the VM 302a, the virtual NIC driver 326b in the VM 302b, and/or the virtual NIC driver 326c in the VM 302c. Each virtual NIC driver may correspond to a portion of a VM that may enable transfer of data between the VMs, operations or services performed by the VMs and the appropriate queues via the main driver 324. In various embodiments of the invention, resources allocated for implementing the TVM 302d may reside in the portion 102b (FIG. 1A), in one or more of the local devices $104_1$-$104_N$, and/or in one or more of the network devices $140_1$-$140_N$.

The host processor 322 may comprise suitable logic, circuitry, interfaces, and/or code that may be operable to control and/or manage data processing, routing and/or other application and/or networking operations associated with the VMs 302a, 302b and/or 302c. In various embodiments of the invention, resources allocated for implementing the host processor 322 may reside in the portion 102b (FIG. 1A), in one or more of the local devices $104_1$-$104_N$, and/or in one or more of the network devices $140_1$-$140_N$.

The host memory 320 may comprise suitable logic, circuitry, and/or code that may be operable to store data utilized by the host system 306. The host memory 320 may be partitioned into a plurality of memory portions. For example, each VM supported by the host system 306 may have a corresponding memory portion or partition in the host memory 320. Moreover, the hypervisor 304 may have a corresponding memory portion in the host memory 320. In this regard, the hypervisor 304 and/or the TVM 302d may enable data communication between VMs by controlling the transfer of data from a portion of the memory 320, which corresponds to one of the VMs, to another portion of the memory 320 that corresponds to another one of the VMs. In various embodiments of the invention, resources allocated for implementing the host memory 320 may reside in the portion 102b (FIG. 1A), in one or more of the local devices $104_1$-$104_N$, and/or in one or more of the network devices $140_1$-$140_N$.

The virtual NIC 310 may comprise suitable logic, circuitry, interfaces, and/or code that may enable communication of data via a network such as the distribution network(s) 110. The virtual NIC 310 may comprise a plurality of physical NICs residing in one or more of the network devices 140, and/or one or more of the local devices 104. The virtual NIC 310 may enable OSI layer 2 (L2) switching. However, the NIC 310 is not so limited and may, for example, be operable to perform switching based on a higher OSI layer and/or any combination of OSI layer 2 (L2), layer 3 (L3), and/or higher OSI layer protocol switching. Furthermore, additional information, for example, from an administrator as to how to perform the switching may be utilized. The virtual NIC 310 may be a shared resource for the plurality of VMs 302a, 302b and/or 302c. The operations of the VMs 302a, 302b and/or 302c and the virtual NIC 310 may be coordinated by the TVM 302d and the hypervisor 304. Exemplary operations of a VM, for example the VM 302a and the virtual NIC 310 may comprise copying of data between the VM 302a and the virtual NIC 310. This may be accomplished by the virtual NIC 310 when the VM 302a communicates to the virtual NIC 310 an address of a buffer or a reference to an address of a buffer to be accessed in the VM 302a. The address may be a physical address or a virtual address. A virtual address may be translated to a physical address via, for example, an address translation table or a memory management unit. The means of address translation may be design and/or implementation dependent. The virtual NIC 310 may also comprise the physical address validator 332. The physical address validator 332 may comprise suitable logic, circuitry, and/or code that may enable the validation of the address of a buffer posted by a virtual NIC driver to store a received packet.

The L2 switch 330 may comprise suitable logic, circuitry, and/or code that may enable the NIC 310 to support packet communication between a VM and the network and/or between VMs, for example. Placing switching functionality in the NIC 310 may, for example, reduce end-to-end latency when transmitting or receiving packets. The L2 switch 330 may support unicast, broadcast, and/or multicast operations. Unicast operations may refer to packet transmissions to a single MAC address. Broadcast operations may refer to packet transmissions to all MAC addresses. Multicast operations may refer to packet transmission to a particular group of MAC addresses. In various embodiments of the invention, resources allocated for implementing the L2 switch 330 may reside in the portion 102b (FIG. 1A), in one or more of the local devices $104_1$-$104_N$, and/or in one or more of the network devices $140_1$-$140_N$.

Figure 4:
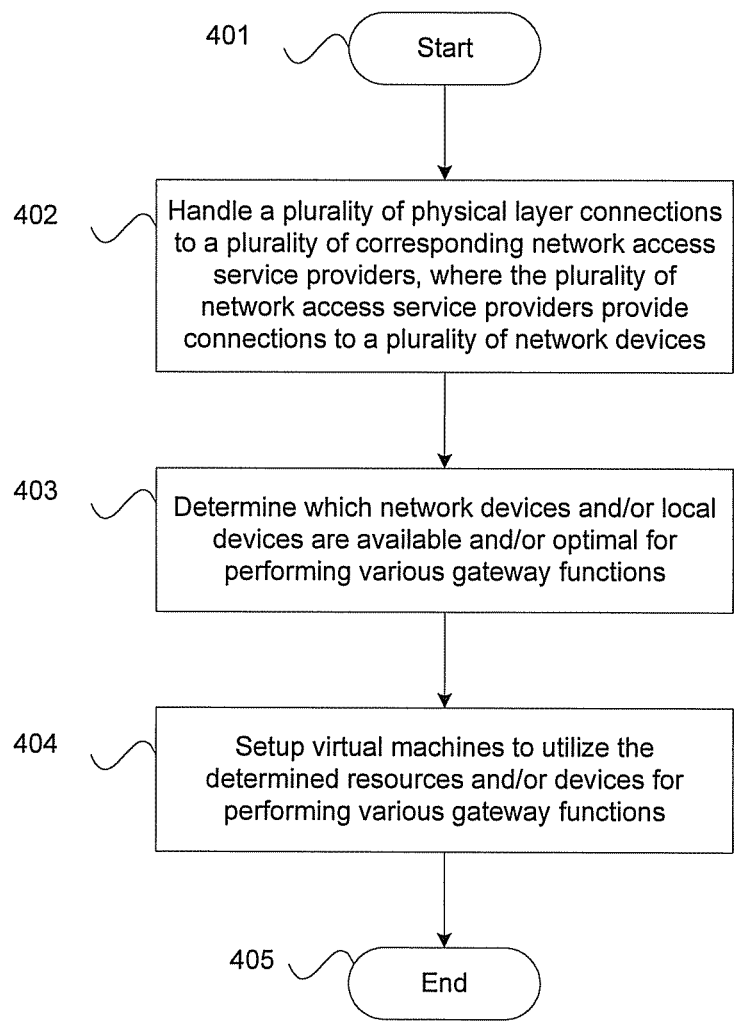
FIG. 4 is a flow chart illustrating exemplary steps for providing virtual gateway services, in accordance with an embodiment of the invention.

FIG. 4 is a flow chart illustrating exemplary steps for providing virtual gateway services, in accordance with an embodiment of the invention. Referring to FIG. 4, the exemplary steps start at step 401. In step 402, the broadband gateway 200 may be operable to handle a plurality of physical layer connections 230a-230b to a plurality of corresponding network access service providers 220a-220b. The plurality of network access service providers 220a-220b may provide connections to a plurality of network devices such as the network devices $140_1$-$140_N$. In step 403, the virtual broadband gateway 102 may be operable to determine which network devices 140 and/or local devices 104 are available and/or optimal for performing various gateway functions. For example, the distribution of a function may be determined based on an energy efficiency associated with performing the function. As another example, a function may be memory-intensive and, thus, a hypervisor or other device that manages the virtual broadband gateway 102, may allocate the function to a network device such as the network device $140_1$ and/or a local device such as the device $104_2$ that has a lot memory and/or fast memory. In step 404, the hypervisor 304 and/or other management entity of the virtual broadband gateway 102 may setup virtual machines 302a-302d to utilize the determined resources and/or devices for performing various gateway functions. The exemplary steps may proceed to the end step 405.

Figure 5:
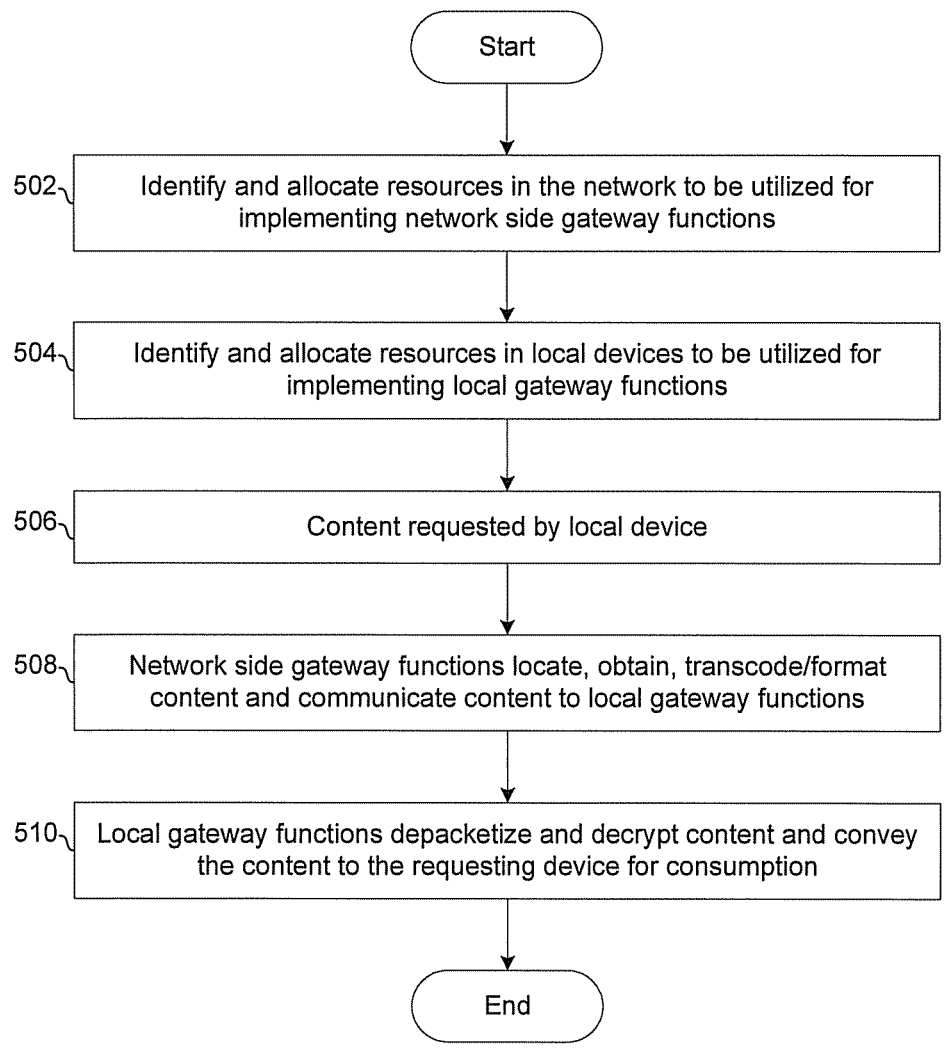
FIG. 5 is a flow chart illustrating exemplary steps for content delivery by a virtual gateway, in accordance with an embodiment of the invention.

FIG. 5 is a flow chart illustrating exemplary steps for content delivery by a virtual gateway, in accordance with an embodiment of the invention. After start, in step 502, resources in network devices $140_1$-$140_N$ may be identified and allocated to performing gateway functions. This identification and allocation may be performed by a hypervisor of the virtual broadband gateway. The allocation may comprise establishing one or more virtual machines running in the identified network devices. In step 504, resources in local devices $104_1$-$104_N$ may be identified and allocated to performing gateway functions. This identification and allocation may be performed by a hypervisor of the virtual gateway. The allocation may comprise establishing one or more virtual machines running in the identified local devices. In step 506, a local device, such as a television, may request content. In step 508, the network side gateway functions, in the network devices 140, may locate the requested content, obtain the requested content, transcode and/or otherwise reformat the requested content to make it suitable for delivery to the local gateway functions, and communicate the content to the local gateway functions. Prior to communicating the content, the network-side gateway functions may packetize and encrypt the content. In step 510, the local gateway functions may depacketize and decrypt the content and convey the content to the device 104 that requested it.

In various embodiments of the invention, a broadband gateway configured to operate as a virtual broadband gateway 102 may comprise a network portion 102a and a local portion 102b. The network portion 102a is communicatively coupled to the local portion 102b via a plurality of physical layer connections 108 to one or more network access service providers in the cloud 112. The virtual broadband gateway 102 may be operable to acquire content from one or more providers in the cloud 112, process the content for delivery to one or more local devices 104 handled by the virtual broadband gateway 102, and deliver the content to the one or more local devices 104. The network portion 102a of the virtual broadband gateway 102 may be implemented in one or more network devices 140. The network devices 140 may be owned and/or operated by one or more content providers in the cloud 112, one or more network access service providers in the cloud 112, and/or one or more independent entities. Resources of the one or more network devices 140 may be allocated to the network portion 102a of the virtual broadband gateway 102 based on energy consumption of the network portion. Gateway functions performed by the network portion 102a may comprise, for example, content downloading, content streaming, content authentication, data format conversion, service negotiation, service selection, data encryption, data decryption and/or data storage.

Resources of one or more local devices 104 may be allocated to the local portion 102b of the virtual broadband gateway 102. Resources of the local devices 104 may be allocated to the local portion 102b of the virtual broadband gateway 102 based on, for example, energy consumption of the local portion 102b, capabilities of the local devices 104, and/or capacities of the local devices 104. Gateway functions performed by the local portion 102b may comprise for example, depacketization, data encryption, data decryption and/or data storage.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing virtual gateway services.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in a broadband gateway configured to operate as a virtual broadband gateway, the virtual broadband gateway comprising a remote network portion external to a housing of the broadband gateway and a local network portion integrated within a housing of the broadband gateway, the remote network portion being communicatively coupled to the local network portion via physical layer connections to one or more network access service providers:
   configuring the remote network portion instead of the local network portion to perform a first function with respect to handling content from one or more providers, responsive to a determination of at least one of energy consumption or device capabilities between the remote network portion and the local network portion;
   configuring the local network portion instead of the remote network portion to perform a second function with respect to handling the content, responsive to the determination;
   acquiring, by the remote network portion, the content from the one or more providers;
   processing, by the remote network portion, the acquired content for delivery to one or more local devices handled by the virtual broadband gateway, the processing including performing the first function, wherein the one or more local devices interface with the local network portion of the broadband gateway; and
   delivering, by the local network portion, the processed content to the one or more local devices after performing the second function.

2. The method according to claim 1, wherein performing the first function comprises one or more of translating the content from a first format to a second format, or encrypting the content.

3. The method according to claim 1, wherein the first function is more efficiently performed in the remote network portion relative to the local network portion with respect to the energy consumption or the device capabilities between the remote network portion and the local network portion.

4. The method according to claim 1, wherein the remote network portion of the virtual broadband gateway is implemented in one or more network devices that are operated by at least one of: one or more independent entities, one or more content providers, or the one or more network access service providers.

5. The method according to claim 1, comprising allocating resources of one or more network devices to the remote network portion of the virtual broadband gateway based on energy consumption of the remote network portion of the virtual broadband gateway.

6. The method according to claim 1, wherein gateway functions performed by the remote network portion of the virtual broadband gateway comprise content downloading, content streaming, content authentication, data format conversion, service negotiation, service selection, data encryption, data decryption, or data storage.

7. The method according to claim 1, wherein resources of one or more of the local devices are allocated to the local network portion of the virtual broadband gateway.

8. The method according to claim 7, comprising determining which of the resources of the one or more local devices to allocate to the local network portion of the virtual broadband gateway, based on energy consumption of the local network portion.

9. The method according to claim 7, comprising determining which of the resources of the one or more local devices to allocate to the local network portion of the virtual broadband gateway based on capabilities or capacities of each of the one or more the local devices.

10. The method according to claim 7, wherein gateway functions performed by the local network portion of the virtual broadband gateway comprise depacketization, data encryption, data decryption or data storage.

11. A system for communication, the system comprising:
    one or more circuits for use in a broadband gateway configured as a virtual broadband gateway, the virtual broadband gateway comprising a remote network portion external to a housing of the broadband gateway and a local network portion integrated within a housing of the broadband gateway, the remote network portion being communicatively coupled to the local network portion via physical layer connections to one or more network access service providers, the one or more circuits configured to:
    configure the remote network portion instead of the local network portion to perform a first function with respect to handling content from one or more providers, responsive to a determination of at least one of energy consumption or device capabilities between the remote network portion and the local network portion;

configure the local network portion instead of the remote network portion to perform a second function with respect to handling the content, responsive to the determination;

acquire content from one or more content providers;

process, by the remote network portion, the acquired content for delivery to one or more local devices handled by the virtual broadband gateway, the processing including performing the first function, wherein the one or more local devices interface with the local network portion of the broadband gateway; and deliver, by the local network portion, the processed content to the one or more local devices after performing the second function.

12. The system according to claim 11, wherein performing the first function comprises one or more of translating the content from a first format to a second format, or encrypting the content.

13. The system according to claim 11, wherein the first function is more efficiently performed in the remote network portion relative to the local network portion with respect to the energy consumption or the device capabilities between the remote network portion and the local network portion.

14. The system according to claim 11, wherein the remote network portion of the virtual broadband gateway is implemented in one or more network devices that are operated by at least one of: one or more independent entities, one or more content providers, or the one or more network access service providers.

15. The system according to claim 11, wherein the one or more circuits are configured to allocate resources of one or more network devices to the remote network portion of the virtual broadband gateway based on energy consumption of the remote network portion of the virtual broadband gateway.

16. The system according to claim 11, wherein gateway functions performed by the remote network portion of the virtual broadband gateway comprise content downloading, content streaming, content authentication, data format conversion, service negotiation, service selection, data encryption, data decryption, or data storage.

17. The system according to claim 11, wherein resources of the one or more local devices are allocated to the local network portion of the virtual broadband gateway.

18. The system according to claim 17, wherein the one or more circuits are configured to determine which of the resources of the one or more local devices to allocate to the local network portion of the virtual broadband gateway based on energy consumption of the local network portion.

19. The system according to claim 17, wherein the one or more circuits are configured to determine which of the resources of the one or more local devices to allocate to the local network portion of the virtual broadband gateway based on capabilities or capacities of each of the one or more local devices.

20. The system according to claim 17, wherein gateway functions performed by the local network portion of the virtual broadband gateway comprise depacketization, data encryption, data decryption or data storage.

21. A machine-readable non-transitory storage medium, having stored thereon, instructions being executable by a processor of a virtual broadband gateway for causing the processor to perform:

configuring a remote network portion of a virtual broadband gateway instead of a local network portion of the virtual broadband gateway to perform a first function with respect to handling content from one or more providers, responsive to a determination of at least one of energy consumption or device capabilities between the remote network portion and the local network portion;

configuring the local network portion instead of the remote network portion to perform a second function with respect to handling the content, responsive to the determination;

acquiring content from one or more providers;

processing, by the remote network portion, the acquired content for delivery to one or more local devices handled by the virtual broadband gateway, the processing including performing the first function, wherein a broadband gateway is configured to operate as the virtual broadband gateway, the virtual broadband gateway comprising the remote network portion external to a housing of the broadband gateway and the local network portion integrated within a housing of the broadband gateway, the remote network portion being communicatively coupled to the local network portion via physical layer connections to one or more network access service providers; and delivering, by the local network portion, the processed content to the one or more local devices after performing the second function, wherein the one or more local devices interface with the local network portion of the broadband gateway.

* * * * *